C. F. HAMMON.
WIND SHIELD.
APPLICATION FILED APR. 8, 1912.
1,116,267.
Patented Nov. 3, 1914.
2 SHEETS—SHEET 1.
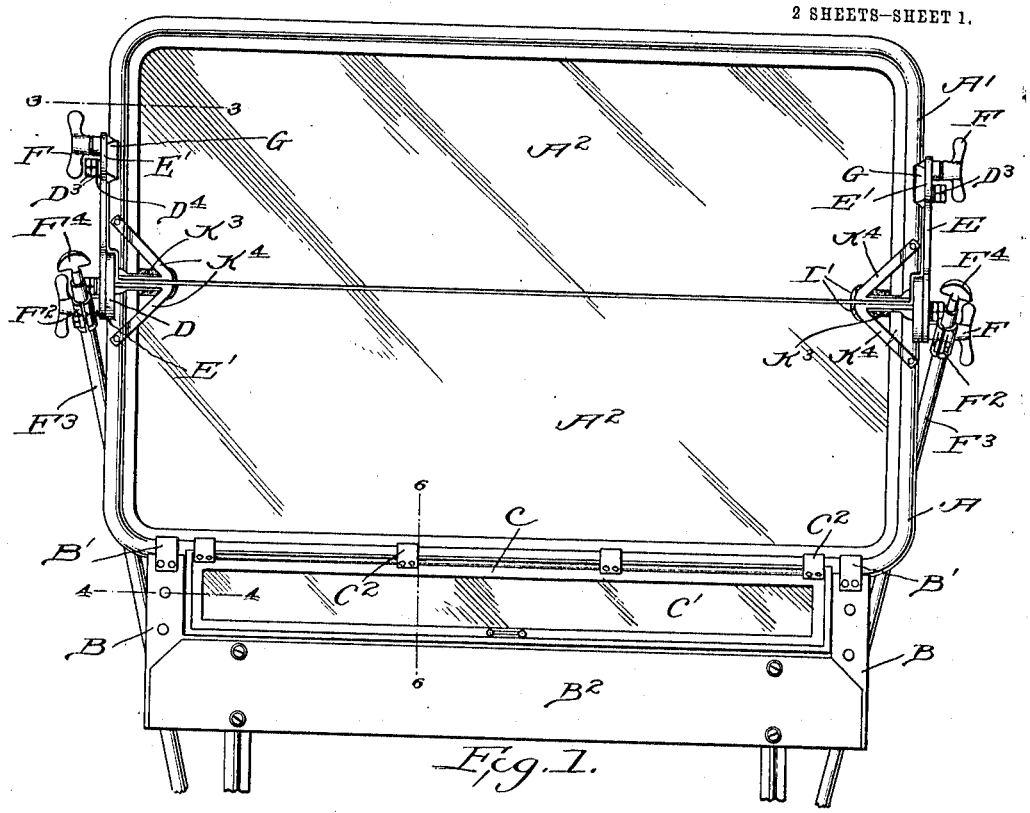
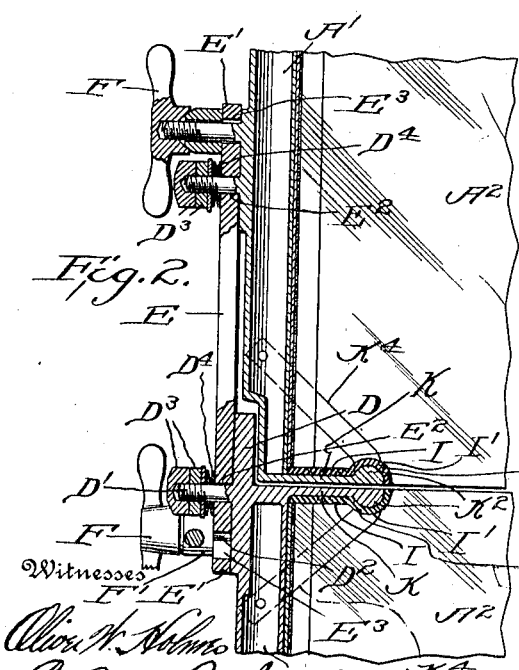
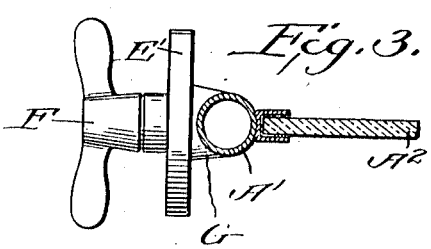
Inventor
Carl F. Hammon
By Chas. E. Brock
Attorney C. F. HAMMON.
WIND SHIELD.
APPLICATION FILED APR. 8, 1912.
1,116,267.
Patented Nov. 3, 1914.
2 SHEETS—SHEET 2.
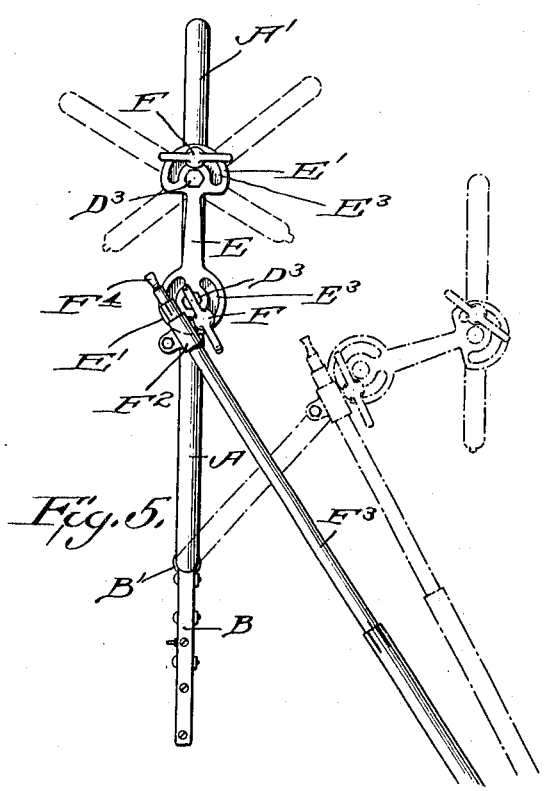
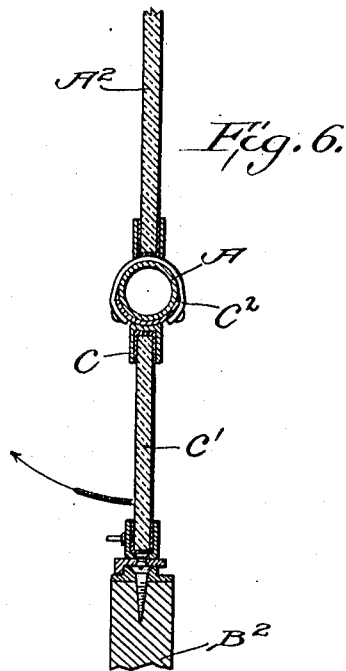
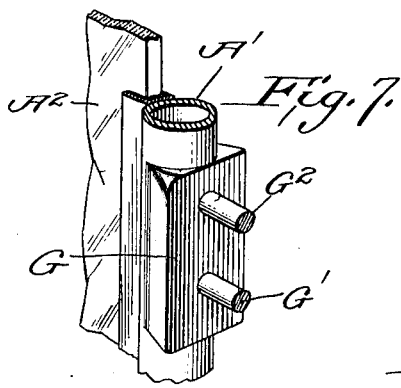
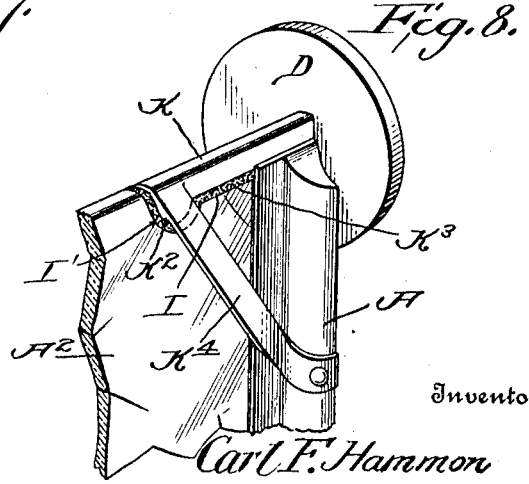
Witnesses
Oliver W. Holmes
E. B. McBath
Inventor
Carl F. Hammon
By Chas. E. Brock
Attorney

UNITED STATES PATENT OFFICE.

CARL F. HAMMON, OF WATERBURY, CONNECTICUT, ASSIGNOR TO THE NOVELTY MANUFACTURING COMPANY, OF WATERBURY, CONNECTICUT, A CORPORATION OF CONNECTICUT.

WIND-SHIELD.

1,116,267.  Specification of Letters Patent.  Patented Nov. 3, 1914.

Application filed April 8, 1912. Serial No. 689,421.

*To all whom it may concern:*

Be it known that I, CARL F. HAMMON, a citizen of the United States, residing at Waterbury, in the county of New Haven and State of Connecticut, have invented a new and useful Improvement in Wind-Shields, of which the following is a specification.

This invention is a novel construction of wind shield for automobiles and similar vehicles, the object of the invention being to provide a wind shield embodying upper and lower protecting panels, said panels being adjustable both in unison and also independently of each other.

Another object of the invention is to provide a wind shield of this character in which a multiplicity of adjustments can be had.

Another object of the invention is to so construct and arrange the various parts that they will be held securely in their various adjusted positions, thereby preventing any of the parts falling or dropping out of position during the adjustment or fastening of any other part.

Another object of the invention is to provide a novel method of securing the glass panel rigidly within the frame and preventing any possible looseness and rattling taking place between the glass panel and frame for the same.

Another object of the invention is to provide a vent at the bottom of the wind shield whereby excessive heat in the forepart of the car can be relieved, and a still further object of the invention is to provide a novel construction of fastening device for connecting the wind shield to the automobile.

With these objects in view and with certain other objects as will appear hereinafter my invention consists in the novel features of construction, combination and arrangement of parts all of which will be fully described and pointed out in the claims.

In the drawings forming a part of this specification: Figure 1 is a rear view of a wind shield constructed in accordance with my invention. Fig. 2 is a vertical sectional view showing the connection between the upper and lower frames and panels. Fig. 3 is a detail sectional view on the line 3—3 of Fig. 1. Fig. 4 is a detail sectional view on the line 4—4 of Fig. 1. Fig. 5 is a side elevation of the wind shield, the various adjustments of the frames and panels being indicated in dotted lines. Fig. 6 is an enlarged detail sectional view taken on the line 6—6 of Fig. 1. Fig. 7 is an enlarged detail perspective view of the flat faced enlargement upon the side of the upper frame and, Fig. 8 is an enlarged detail perspective view illustrating the manner of connecting the free end of the glass panel to its frame.

In the practical embodiment of my invention, I employ a lower frame A and an upper frame A', said frames constituting when connected a rectangle and each frame carries a glass panel A², the upper edge of the lower panel being free and the lower edge of the upper panel being free so that when the two panels meet the smallest possible division takes place, thereby providing a complete transparent shield, the vision not being interrupted by any intersection cross members carried by the upper and lower edges respectively of the glass panels. In practice I prefer to construct the frames A and A' of tubing to which is connected a channeled strip in which rests the edge of the glass panel, any suitable cement being employed to secure the glass within the channeled strip.

The lower frame A is pivotally connected to castings B, by means of clips B'. The castings B are adapted to be attached to the opposite ends of the filler board B², said castings being made hollow as shown to receive the end of the filler board and having their outer portions extending a considerable distance so as to firmly embrace the end of said filler board as most clearly shown in Figs. 1 and 5. Between the lower end of the lower frame and the filler board, I arrange a supplemental frame C having a glass panel C', said frame being pivotally connected to the tubing of the lower frame by means of clips C², and this supplemental frame C is of such size and shape as to fit snugly between the frame and filler board and end castings and is adapted to swing inwardly and upwardly, a suitable handle being provided. In automobiles in which the forepart thereof is inclosed, it often occurs that the forepart of the car becomes very warm and in order to ventilate the forepart of the car and still maintain a protective wind shield, I provide this supplemental inwardly and upwardly swinging frame, which is preferably provided with a glass panel, but it will of course be understood that it is not absolutely necessary that this panel be transparent although it adds materially to the efficiency of the shield as a whole, to have the same transparent.

The lower frame A is provided at its opposite upper ends with disks D, each disk having a pivot pin or screw D' and binding pin or screw D², nuts D³ and spring washers D⁴ being arranged upon the pivot pins.

E—E indicate arms which serve to connect the upper and lower frames, said arms having disk-like enlargements E' at their upper and lower ends, and each disk-like enlargement is provided with a pivot hole E² through which the pivot pins D' pass, and in addition to the pivot hole E², each disk-like enlargement is provided with a concentric slot E³ and in which the binding pin or screw works, a hand nut F being screwed upon the screw D² and serving to rigidly bind the disk D and lower enlargements E' together, a suitable washer F' being interposed, and in practice I prefer to make this washer F' in the form of a casting which carries a split collar F² into which is fitted the upper end of the tubular brace rod F³, said tubular brace rod being preferably constructed in telescopic sections so as to compensate for the adjustments hereinafter described and are locked in their adjusted positions through the medium of a rod F⁴ and divided nut, (not shown).

Broad flat faced bearings G are provided upon the opposite sides of the upper frame adjacent the center of said sides, each broad faced bearing having a pivot pin or screw G' and a binding screw G², the pivot pin passing through the pivot hole E², while the binding screw works in the concentric slot E³ which is produced in the disk-like enlargement E' but in reverse order as most clearly shown in Fig. 5, and the hand nut is screwed upon the binding screw, suitable washers being interposed and preferably made conical as shown. Nuts D³ and spring washers D⁴ are fastened upon the pivot pins or screws G', and sufficient tension can be placed upon these spring washers to bind the parts together under normal conditions and this connection between the disk D, broad flat bearings G and the disk like enlargements E' will be sufficient to hold the upper and lower frames in their adjusted positions under normal conditions until they can be securely locked by the independent locking means, namely the binding hand nuts F. By this it will be understood that during any adjustment or manipulation during which the binding nuts are released, the action of the tension nuts and spring washers will be sufficient to maintain the parts in their normal positions thereby preventing the upper frame or any of the parts dropping down or becoming misplaced.

The desired adjustment can then be completed and the parts securely locked by turning up the binding nuts F.

By means of a wind shield constructed and arranged as herein shown and described it is obvious that a multiplicity of adjustments can be had.

If desired the wind shield comprising the upper and lower frames and panels can be maintained either in a vertical position, or inclined forwardly or rearwardly as desired. Furthermore the lower frame can be maintained in a vertical position and the upper frame turned to either a horizontal position or a forwardly or rearwardly inclined position, and in addition to these adjustments it is obvious that the lower frame can be inclined either forwardly or rearwardly and at the same time and independent thereof the upper frame can be inclined either forwardly or rearwardly. During these various adjustments the upper frame and the arms turn upon the pivot pins or screws, the binding screws working freely in the concentric slots, and when the parts are locked together the binding nut transmits its force to the washer which of course is of such size as to extend across the concentric groove so as to bind the disk like enlargements of the arms to the disk and the broad flat bearing surface carried by the upper frame.

In view of the fact that there is no intersecting cross strip the view through the shield will be absolutely unobstructed.

The upper and lower frames being open rectangles, I deem it advisable to provide a connection between the glass panels and the upper and lower ends respectively of the lower and upper frames so as to prevent any possible looseness at this point and this I accomplish by reducing each panel slightly for a short distance at each end, said reduction being indicated at I and at the inner end of each reduced portion I provide a recess or notch or opening I' and resting within or upon the reduced portion the small metal bar K having a protuberance K² at its inner end, which is of a size and shape adapted to fit in the recess or notch I'.

Downwardly extending brace portions K⁴ are rigidly connected to the bars K and sides of the frame upon opposite sides of the glass panel as most clearly shown in Figs. 1, 2 and 8 and these braces are brazed or otherwise connected to the parts so as to provide an absolutely rigid connection and it will be noted that the edge of the bar is flush with the edge of the panel and in turning the frame and panels back and forth upon their pivots these metallic bars will receive whatever strain or pressure is exerted at these points and thereby save the edges of the glass panels from grinding one upon the other.

In practice I prefer to employ a cushion

K³ of leather or other suitable material in order to prevent breaking of the glass at the point of connecting the bars K. By means of this connection it is obvious that there is no possibility of the frame spreading at the sides and consequently the glass panel will be rigidly held within the frame at all times.

From the foregoing description taken in connection with the accompanying drawings, it will be understood that I provide a wind shield capable of carrying out all of the objects herein mentioned. It will also be understood that certain changes and modifications can be made in the features of construction and arrangement without departing from the fundamental principles of my invention.

What I claim is,—

1. In a wind shield, the combination with the upper and lower frames, of a filler-board and end castings, the lower frame being pivotally connected to said castings and a supplemental frame pivoted to said lower frame and adapted to occupy the space between the filler-board, castings and lower frame as set forth.

2. In a wind shield the combination with a filler-board and castings, of a wind shield frame pivotally connected to said castings and a supplemental frame arranged between the castings and pivotally connected to the wind shield frame, said supplemental frame having a panel and being adapted to open and close the space between the filler-board and frame as set forth.

CARL F. HAMMON.

Witnesses:
JENNIE P. DAVIDSON,
ALICE JONES.

Copies of this patent may be obtained for five cents each, by addressing the "Commissioner of Patents, Washington, D. C."